United States Patent [19]
Carlson

[11] Patent Number: 4,865,508
[45] Date of Patent: Sep. 12, 1989

[54] VEHICLE RESTRAINT

[75] Inventor: Dennis L. Carlson, Waukesha, Wis.

[73] Assignee: Kelley Company Inc., Milwaukee, Wis.

[21] Appl. No.: 290,833

[22] Filed: Dec. 28, 1988

Related U.S. Application Data

[63] Continuation of Ser. No. 52,497, May 21, 1987, abandoned.

[51] Int. Cl.$^4$ ............................................. B65G 69/00
[52] U.S. Cl. ......................................... 414/401; 14/71.1
[58] Field of Search .............. 414/396, 401, 584, 71.1, 414/71.3

[56] References Cited

U.S. PATENT DOCUMENTS

| | | | |
|---|---|---|---|
| 2,693,284 | 11/1954 | Gerhardt | 214/38 |
| 4,127,856 | 11/1978 | Bickel | 340/687 |
| 4,148,498 | 4/1979 | Taylor, Jr. | 280/482 |
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,555,211 | 11/1985 | Metz | 414/401 |
| 4,560,315 | 12/1985 | Hahn | 414/401 |
| 4,589,813 | 5/1986 | Hagen et al. | 414/401 |
| 4,605,353 | 8/1986 | Hahn | 414/401 |
| 4,630,989 | 12/1986 | Davey | 414/401 |
| 4,634,334 | 1/1987 | Hahn et al. | 414/401 |

*Primary Examiner*—Robert J. Spar
*Assistant Examiner*—Robert S. Katz
*Attorney, Agent, or Firm*—Andrus, Sceales, Starke & Sawall

[57] ABSTRACT

A vehicle restraint for preventing a vehicle or truck from accidentally pulling away from a loading dock. The truck restraint comprises a frame to be mounted on the vertical front face of the loading dock and a restraining member is mounted for pivotal movement in a generally vertical plane parallel to the dock face between a first lower storage position and a second operative position where the restraining member will prevent outward movement of the truck away from the dock. A curved plate or abutment is mounted in spaced relation to the frame and extends throughout the length of the path of pivotal movement of the restraining means. The restraining member is normally disposed out of contact with the abutment as the restraining member pivots between the storage and operative positions. In the event the truck attempts to pull away from the loading dock while the restraining member is in the operative position, the outward force applied by the truck to the restraining member will deflect the restraining member outwardly into contact with the abutment to thereby restrict further outward movement of the restraining member. The restraining member is urged to the operative position by a resilient biasing member and the biasing member is movable between a first position where the force of the biasing member overcomes the weight of the restraining member and acts to urge the restraining member to the operative position, and a second position where the force of the biasing member is overcome by the weight of the restraining member so that the restraining member will move by gravity to the storage position.

14 Claims, 2 Drawing Sheets

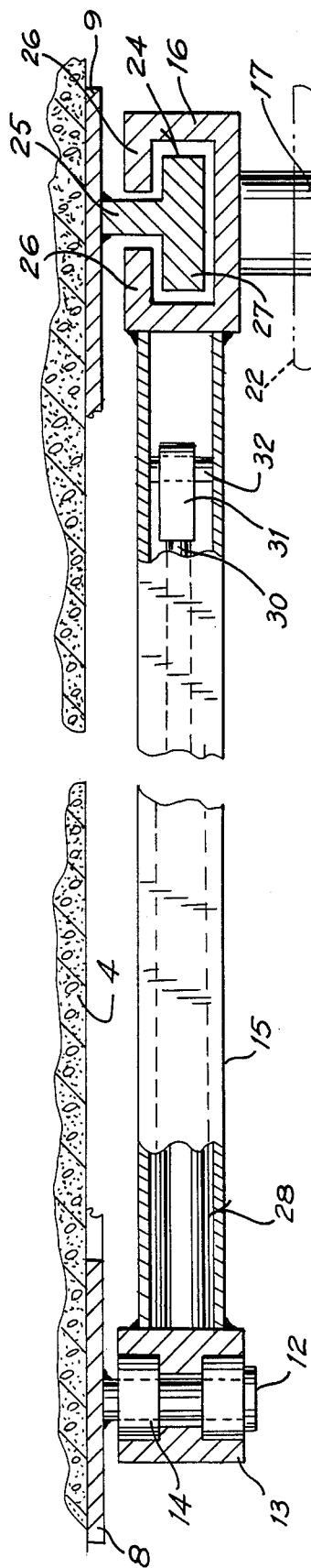
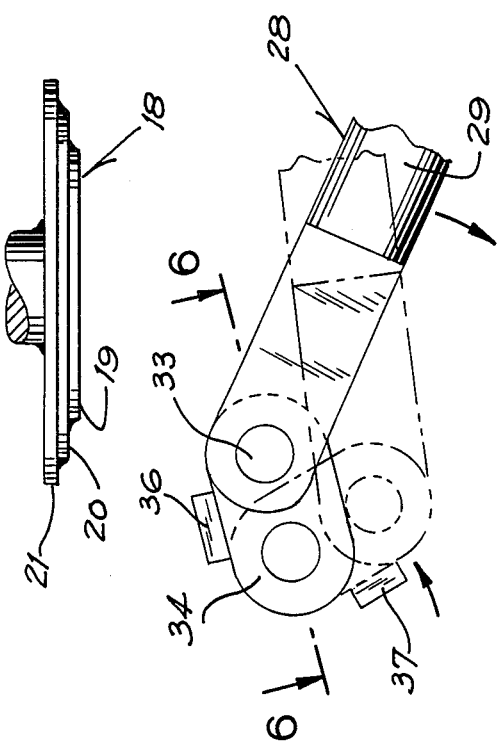
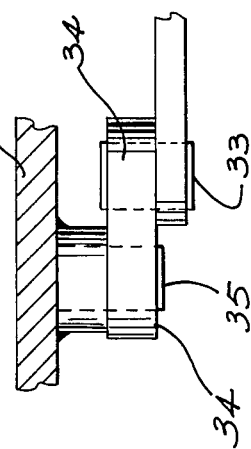
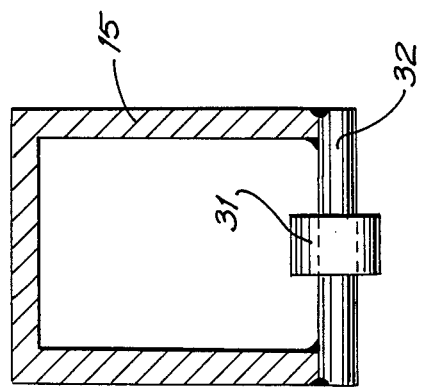

VEHICLE RESTRAINT

This is a continuation of application Ser. No. 07/052,497, filed May 21, 1987, now abandoned.

BACKGROUND OF THE INVENTION

Vehicle or truck restraints are frequently associated with a loading dock to prevent accidental movement of a truck away from a loading dock while a loading operation is in progress and the conventional truck restraint is designed to engage the ICC bar which is a horizontal bar or beam located beneath the rear end of the truck bed.

Various forms of truck restraints have been proposed. In certain truck restraints, a hook-like restraining member is pivoted in a vertical plane between a lower storage position and an upper operative position where it will engage the ICC bar and prevent movement of the truck away from the dock, while other truck restraints utilize a linear moving hook that is moved vertically between a lower storage position and an upper operative position.

If a truck attempts to pull away from the loading dock while the truck restraint is in the operative position, a substantial force is exerted by the truck against the restraining hook. To withstand this outward force, the truck restraint is designed with substantial size and weight which results in considerable frictional resistance to movement of the hook. Because of the frictional resistance, a substantial actuation force is required to move the hook between the storage and operative positions.

A truck restraint must also incorporate a provision to accommodate float of the truck bed during a loading operation. As cargo or material handling equipment, such as a fork-lift truck, is moved onto the truck bed, the truck bed will depress against the force of the truck suspension. Conversely, as cargo is removed from the truck bed, the truck bed will rise. The truck restraint must be able to accommodate this float to maintain the restraining member or hook in engagement with the truck at all times during the loading operation. With a conventional truck restraint which has substantial size and weight, relatively large spring forces are required to provide the floating action.

While all trucks are required to have an ICC bar to prevent underriding of an automobile in the event of a rear end collision, the fore and aft location, as well as the vertical height, of the ICC bar may vary from truck to truck. It is important that a truck restraint be capable of handling both extreme high and low ICC bars in order to have universal usage.

SUMMARY OF THE INVENTION

The invention is directed to an improved truck restraint for preventing accidental movement of a vehicle or truck away from a loading dock during a loading operation. The truck restraint of the invention includes a frame or supporting structure that is mounted on the vertical front face of the loading dock and a restraining means is mounted on the frame for pivotal movement in a vertical plane parallel to the dock face between a lower storage position and an operative position where the restraining means will prevent outward movement of the truck from the loading dock.

The truck restraint also includes a generally curved abutment or force restraining means that is mounted in spaced relation to the frame and complements the curved path of pivotal movement of the restraining means. During normal pivotal movement from the storage to the operative position, the restraining means is out of contact with the abutment. However, if a truck attempts to pull away from the dock while the restraining means is in the operative position, the truck will exert an outward force, tending to deflect the restraining means into engagement with the abutment and the abutment will then restrict further outward deflection of the restraining means.

To provide floating action for the truck restraint, a resilient biasing member interconnects the restraining means to the frame or supporting structure. In a preferred form of the invention, the biasing member takes the form of a gas spring and one end of the gas spring is movably mounted with respect to the frame between a first and second position. With the biasing member in the first position, the force of the biasing member will overcome the weight of the restraining means and will bias the restraining means to the operative position. By moving the biasing member to the second position, the force of the biasing member will be overcome by the weight of the restraining means so that the restraining means will move by gravity to the storage position.

With the construction of the truck restraint of the invention, the frictional resistance to movement of the restraining means is substantially reduced which enables the restraining means to be moved with a reduced actuation force, and yet, the restraining means is still able to absorb large pull-out forces exerted by the truck. The low frictional resistance also enables a lesser spring force to be used to accommodate floating action of the truck bed.

As a further advantage, the truck restraint of the invention has the capability of accommodating very low ICC bars, as low as 6 to 7 inches from the ground. This is a substantial improvement over certain vehicle restraints which are unable to accommodate ICC bars which are lower than 15 inches from the ground.

Other objects and advantages will appear in the course of the following description.

DESCRIPTION OF THE DRAWINGS

The drawings illustrate the best mode presently contemplated of carrying out the invention.

In the drawings:

FIG. 3 is a horizontal section taken along line 3—3 of FIG. 2;

FIG. 4 is a section taken along line 4—4 of FIG. 2 and showing the connection of the gas spring to the restraining means;

FIG. 5 is an enlarged fragmentary plan view showing the attachment of the gas spring to the frame; and FIG. 6 is a section taken along line 6—6 of FIG. 5.

DESCRIPTION OF THE ILLUSTRATED EMBODIMENT

Figure 1:
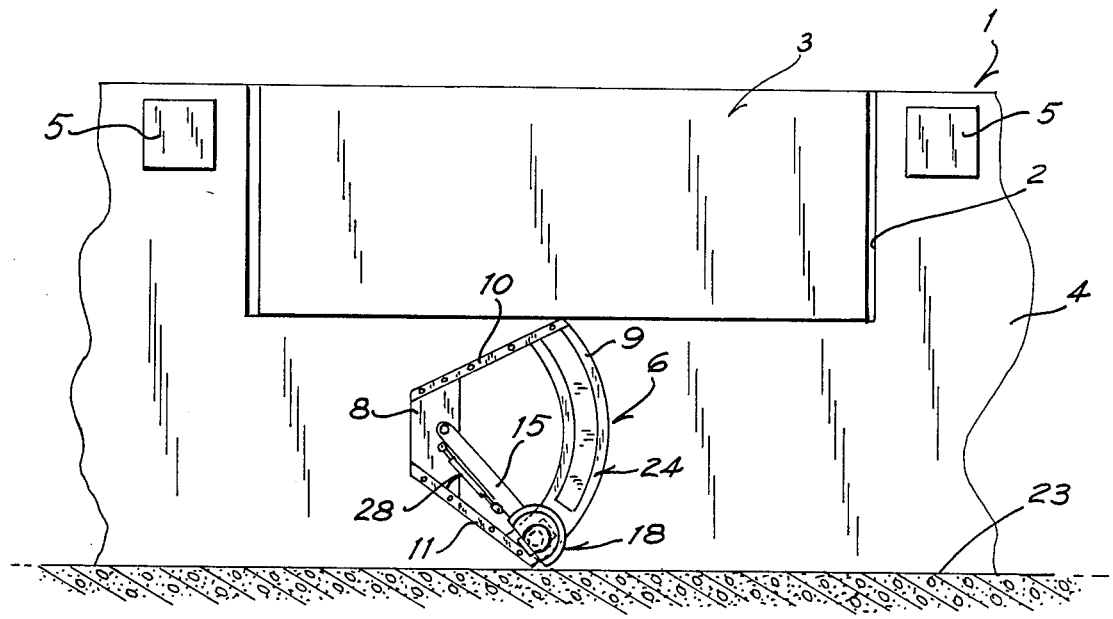
FIG. 1 is a front elevational view of a loading dock incorporating the vehicle restraint of the invention.

FIG. 1 shows a typical loading dock 1 having a pit or depression 2 formed in its upper surface to receive a dockboard 3. Dockboard 3 is a device which can be employed to span the gap between the loading dock and the bed of a truck parked in front of the dock and in itself forms no part of the present invention.

Located on the front face 4 of dock 1 on either side of pit 2 are bumpers 5. When a truck backs toward the loading dock, the rear end of the truck will engage bumpers 5 to space the bed the truck from the dock.

In accordance with the invention, a vehicle restraint 6 is mounted on the front face 4 of dock 1 and can be employed to prevent accidental movement of a truck away from the loading dock while a loading operation is in progress.

Truck restraint 6 includes a frame or supporting structure 7 that is mounted on front face 4. Frame 7 is composed of a plate 8, a generally curved plate 9 which is spaced from plate 8, and a pair of diverging members 10 and 11 which connect the corresponding ends of plates 8 and 9. Members 10 and 11 can be secured to front face 4 by conventional anchor bolts.

Truck restraint 6 also includes a pivotable restraining means that is composed of a horizontal shaft 12 which projects outwardly from plate 8 and a hub 13 is journalled about shaft 12 by a ball bearing assembly, indicated generally by 14. Secured to hub 13 is an arm 15 which is disposed generally parallel to front face 4 of dock 1. As illustrated, arm 15 is a channel, being generally U-shaped in cross-section, with the open end of the channel facing downwardly.

The opposite end of arm 15 is welded or otherwise secured to a C-shaped member 16 and a tubular arm 17 is secured to member 16 and projects outwardly from dock face 4, as shown in FIG. 3. Mounted on the end of arm 17 is a truck restraining member 18 which takes the form of a series of superimposed discs 19, 20 and 21. The three discs provide increased strength for the restraining member and project upwardly from the arm 17 to provide a stop or abutment which will be located outwardly of the ICC bar 22 of the truck to prevent the truck from moving away from the dock.

Figure 2:
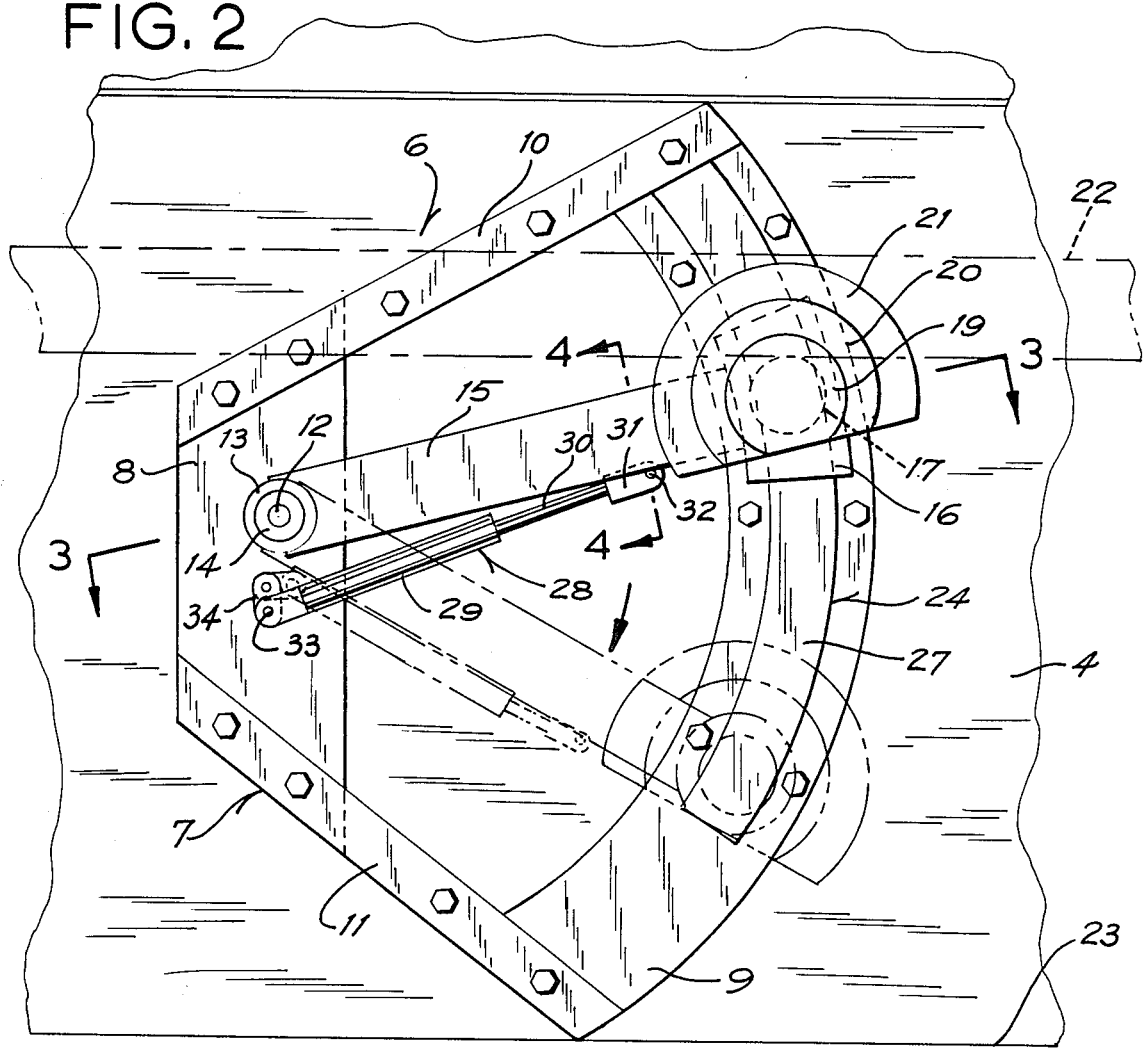
FIG. 2 is an enlarged elevation view of the vehicle restraint showing the restraining means in the operative position.

As shown in FIG. 2, the discs 19-21 have a generally curved or semi-circular periphery and the lower portion of the periphery is cut away to enable the restraining member 18 to be positioned adjacent the driveway or foundation 23 of the loading dock.

The truck restraint 6 is normally in a lower storage position with arm 15 extending downwardly at an angle toward driveway 23 as shown in FIG. 1. After the truck has pulled into loading position in front of the dock, the truck restraint is moved upwardly to the operative position as shown in FIG. 2 in which the arm 17 will engage the undersurface of ICC bar 22 and the disc-like restraining member 18 will prevent outward movement of the ICC bar from the loading dock.

As the arm 15 that carries restraining member 18 is journalled for pivoting movement by the ball bearing assembly 14, there is little frictional resistance to movement of the restraining member between the storage and operative positions.

To resist outward force applied to the restraining member 18 by a truck attempting to pull away from the dock, a generally curved bar 24 having a T-shaped cross-section is secured to plate 9. As shown in FIG. 3, bar 24 is composed of a stem portion 25 which extends outwardly between the spaced lips 26 of C-member 16, and a head 27 which is connected to stem 25 and is disposed generally parallel to plate 9. As illustrated in FIG. 3, head 27 is located within the interior of C-member 16 but in normal movement of the arm 15, it is out of contact with the C-member.

If a truck attempts to pull away from the loading dock while the truck restraint is in the operative position, the outward force of the truck will be applied to restraining member 18 which will tend to deflect arm 15 outwardly and bring the lips 26 into contact with the head 27 of T-bar 24. Engagement of the C-member 16 with the T-bar 24 will resist further outward movement of the restraining member 18 from the dock face 4. Thus, T-bar 24 serves as an abutment which is normally out of contact with the restraining means during normal operation, but will be contacted by the restraining means if an excessive outward force is applied by the truck.

The truck restraint of the invention also incorporates a mechanism to accommodate upward and downward float of the truck bed and ICC bar 22 during a loading operation. In this regard, a resilient member, which as illustrated, takes the form of a gas spring unit 28 is interconnected between the restraining means and frame 7. Gas spring unit 28 is a conventional type containing a compressible gas, such as air or nitrogen. The unit includes a cylinder 29 and a piston is slidable within the cylinder and carries a piston rod 30 which extends outwardly from one end of the cylinder. As the face of the piston to which the piston rod is not attached, has a greater area than the opposite face of the piston to which rod 30 is attached, the compressed gas acting against the face of larger piston area will exert an outward force on rod 30. As the piston moves within the cylinder the gas will move from one end of the cylinder to the other through orifices in the piston in a conventional manner.

Piston rod 30 carries clevis 31 which is pivotally connected to a rod 32 secured to the lower edge of arm 15, while the opposite end of cylinder 29 is pivotally connected by pin 33 to one end of a link 34. The opposite end of pivotable link 34, as best shown in FIG. 6, is pivotally connected to pin 35 that extends outwardly from plate 8.

When gas spring unit 28 is in the full line position shown in FIG. 2, the biasing force exerted by the gas spring unit will counterbalance the weight of the restraining means and will urge the restraining means to the operative position, as shown in FIG. 2. By pivoting link 34 to the position as shown in FIG. 5, either manually or by power actuated mechanism, the force exerted by the gas spring unit 28 will be insufficient to counterbalance the weight of the restraining means with the result that the restraining means will fall by gravity from the operative to the storage position.

Stops 36 and 37 are mounted on plate 8 to determine the two positions of the link 34 as illustrated in FIG. 5, and to absorb the thrust at the gas spring 28.

OPERATION

The truck restraining means is normally in the lower storage position as shown in FIG. 1. As a truck backs toward the loading dock, the rear end of the truck will engage bumpers 4 and a workman standing on the dock and using a long tool or implement can then flip the link 34 downwardly to the solid line position shown in FIG. 2 where the force of the gas spring unit will then pivot the restraining means upwardly until the outwardly extending tubular member 17 engages the lower surface of the ICC bar 22 as shown in FIG. 2. In this position, ICC bar 22 will be located between the dock and the restraining member 18 which will prevent the truck from pulling away from the dock.

During the loading operation, if the truck bed and ICC bar 22 should descend, the resilient gas spring unit 28 will accommodate the downward float. Conversely, if the ICC bar 22 and truck bed should float upwardly, the gas spring unit 28 will extend to accommodate the upward float. Thus, the vehicle restraint will fully accommodate both upward and downward float of the truck bed during the loading operation.

After the loading operation has been completed, link 34 is moved to the upper position as shown in FIG. 5, so that the force of the gas spring unit 28 will then be insufficient to overcome the weight of the restraining means, enabling the restraining means to move by gravity to the storage position.

With the truck restraint of the invention, the only frictional resistance to pivotal movement of the restraining means is through the ball bearing assembly 14. Because of the reduced frictional resistance, as compared to conventional truck restraints, smaller actuation forces can be utilized to move the restraining means and a lesser spring force is required to accommodate float of the ICC bar and truck bed.

While the drawings have shown the truck restraint of the invention as being biased to the operative position, it is contemplated that it can also be moved by a power actuated member, such as a fluid cylinder, linear actuator, hydraulic or electric motor, or the like. Similarly, while a gas spring is shown as a mechanism for providing float for the restraining means, it is apparent that other resilient members can be substituted to accommodate the floating action.

Various modes of carrying out the invention are contemplated as being within the scope of the following claims particularly pointing out and distinctly claiming the subject matter which is regarded as the invention.

I claim:

1. A vehicle restraint to prevent a vehicle from moving away from a fixed object, comprising a supporting structure to be mounted on a generally vertical face of a fixed object, restraining means having an inner end mounted for pivotal movement in a generally vertical plane about a horizontal axis extending generally normal to said face, said restraining means having an outer vehicle restraining end, said restraining means being movable between a first storage position and a second operative position where said outer end will prevent movement of said vehicle away from said object, abutment means on said supporting structure and spaced from said axis, said abutment means being located adjacent said outer end and being constructed and arranged so that contact between said abutment means and said outer end will restrain outward movement of said outer end when said restraining means is in the operative position and a vehicle applies an outward pulling force to said outer end.

2. The vehicle restraint of claim 1, and including operating means for moving said restraining means from the storage to the operative position.

3. The vehicle restraint of claim 2, wherein said operating means comprises a resilient member interconnecting the supporting structure and said restraining means for biasing said restraining means to the operative position.

4. The vehicle restraint of claim 1, wherein said abutment means comprises an abutment spaced outwardly of the supporting structure and said outer end includes a section disposed within the space between said abutment and said supporting structure, said outward pulling force acting to deflect said section into contact with said abutment.

5. The vehicle restraint of claim 4, wherein said abutment means comprises a generally T-shaped bar having a stem portion connected to said supporting structure and having a head connected to the outer end of said stem, said outer end including a pair of spaced sections with said stem being disposed between said sections and said head being located outwardly of said sections.

6. The vehicle restraint of claim 1, wherein said abutment means is curved and conforms to the path of pivotal movement of said restraining means.

7. A vehicle restraint for preventing accidental outward movement of a vehicle away from a fixed object, comprising frame means to be mounted on a generally vertical face of said object, restraining means mounted for movement in a generally vertical plane parallel to said face between a first storage position and a second operative position where said restraining means will prevent outward movement of a truck away from said object, biasing means to urge the restraining means to the operative position and connected between said restraining means and said frame means, said biasing means having a first position where the force of said biasing means acts to counterbalance the weight of said restraining means and move said restraining means to the operative position and said biasing means having a second position wherein the force of said biasing means is overcome by the weight of said restraining means and said restraining means is moved by gravity to the storage position.

8. The vehicle restraint of claim 7, wherein said biasing means includes a resilient member interconnected between said frame means and said restraining means, and adjusting means for adjusting the location of the pivotal connection of said resilient member to one of said frame means and said restraining means, whereby said biasing means can be moved between said first and second positions.

9. The vehicle restraint of claim 8, wherein one end of said resilient member is pivotally connected to said restraining means, a link having a first end pivotally connected to the opposite end of said resilient means and said link having a second end pivotally connected to said frame means, pivotal movement of said link relative to said frame means acting to move said resilient member between the first and second positions.

10. A vehicle restraint to prevent a vehicle from moving away from a fixed object, comprising a supporting structure to be mounted on a generally vertical face of a fixed object, restraining means mounted for pivotal movement in a generally vertical plane about a horizontal axis extending normal to said face between a first storage position and a second operative position, said restraining means comprising a first member having an inner end journalled for rotation about said horizontal axis, a second member connected to the outer end portion of said first member and extending outwardly in a direction away from said supporting structure, said restraining means also including a third member connected to the outer end of said second member and extending vertically upward from said second member, said second member being constructed and arranged to engage the lower surface of an element on said vehicle as said restraining means is pivoted from said storage position to said operative position, and said third member being constructed and arranged to be disposed outwardly of said element when said restraining means is in the operative position to prevent movement of said vehicle away from said object.

11. The vehicle restraint of claim 10, wherein the outer end portion of said first member inscribes an arc as the restraining means is pivoted between said storage position and said operative position, said vehicle restraint also including abutment means spaced from said horizontal axis and extending substantially coextensively with said arc, said abutment means disposed to be engaged by the outer end portion of said first member as the vehicles applies an outward pulling force to said third member.

12. A vehicle restraint to prevent a vehicle from moving away from a loading dock comprising a supporting structure to be mounted on a generally vertical face of a loading dock, restraining means mounted for pivotal movement in a generally vertical plane about a horizontal axis extending generally normal to said face, said restraining means being movable between a first storage position and a second operative position, said restraining means including an arm having an inner end journalled for rotation about said axis and a restraining member connected to the outer end portion of said arm and extending vertically from said outer end portion to a level above said arm, and abutment means connected to said supporting structure and spaced from said horizontal axis, said abutment means being disposed inwardly toward said dock from said restraining member and disposed to be engaged by said arm as the vehicle applies an outward pulling force to said restraining means.

13. The vehicle restraint of claim 12, and including resilient means interconnecting said restraining means and said supporting structure for permitting said restraining means to move up and down in accordance with vertical float of said vehicle.

14. The vehicle restraint of claim 10, and including resilient means interconnecting said restraining means and said supporting structure for permitting said restraining means when in the operative position to move up and down in accordance with vertical float of said vehicle.

* * * * *